United States Patent [19]

Ueno

[11] Patent Number: 5,661,568
[45] Date of Patent: Aug. 26, 1997

[54] DATA COMMUNICATION APPARATUS

[75] Inventor: Yasuhide Ueno, Fuchu, Japan

[73] Assignee: Canon Kabushiki Kaisha, Tokyo, Japan

[21] Appl. No.: 371,493

[22] Filed: Jan. 11, 1995

Related U.S. Application Data

[63] Continuation of Ser. No. 857,313, Mar. 25, 1992, abandoned.

[30] Foreign Application Priority Data

Mar. 29, 1991 [JP] Japan ................ 3-065837

[51] Int. Cl.⁶ .................. H04N 1/00; H04N 1/32
[52] U.S. Cl. .............. 358/435; 358/412; 358/436; 358/440; 379/100.1
[58] Field of Search .................. 358/400, 405, 358/425, 434, 435, 436, 440, 412; 395/105, 114, 115, 116; 375/222, 357, 358; 379/90, 93, 98, 100

[56] References Cited

U.S. PATENT DOCUMENTS

| | | |
|---|---|---|
| 4,589,111 | 5/1986 | Adachi . |
| 4,734,780 | 3/1988 | Iwata et al. ................. 358/257 |
| 4,876,609 | 10/1989 | Ogura . |
| 4,890,316 | 12/1989 | Walsh et al. ................. 379/98 |
| 4,897,831 | 1/1990 | Negi et al. . |
| 4,910,506 | 3/1990 | Yoshida et al. . |
| 4,975,783 | 12/1990 | Takaoka . |
| 5,025,469 | 6/1991 | Bingham ................. 379/98 |
| 5,031,179 | 7/1991 | Yoshida et al. . |
| 5,041,917 | 8/1991 | Koshiishi . |
| 5,057,938 | 10/1991 | Edamura ................. 358/406 |
| 5,075,783 | 12/1991 | Yoshida et al. . |
| 5,105,423 | 4/1992 | Tanaka et al. . |
| 5,127,013 | 6/1992 | Yoshida . |
| 5,150,400 | 9/1992 | Ukegawa ................. 379/93 |
| 5,233,627 | 8/1993 | Kozima et al. ................. 375/8 |

FOREIGN PATENT DOCUMENTS

| | | |
|---|---|---|
| 3927180 | 2/1990 | Germany . |
| 2222740 | 3/1990 | United Kingdom . |

*Primary Examiner*—Bentsu Ro
*Attorney, Agent, or Firm*—Fitzpatrick, Cella, Harper & Scinto

[57] ABSTRACT

A data communication apparatus for sending communication protocol signals and data has a low speed modem and a high speed modem. The protocol signal can be communicated by the high speed modem, and data communication can be started by the high speed modem without communication of a protocol signal by the low speed modem after communication of the protocol signals by the high speed modem. Other aspects of the data communication apparatus include the performance of ECM communication, the detection and storage of a communication result of a defined type to enable modification of future operations based on the stored result and the provision of first and second communication modes using recommended and not recommended communication protocols. The data communication apparatus can also communicate the protocol signal as data of a type otherwise communicated.

100 Claims, 20 Drawing Sheets

MEMORY FORMAT OF AUTO-DIAL REGISTRATION MEMORY

| ONE-TOUCH KEY-01 | ONE-TOUCH KEY-02 | ONE-TOUCH KEY-03 | ONE-TOUCH KEY-04 |
|---|---|---|---|
| : | : | : | : |
| : | : | : | : |
| : | : | : | : |
| ONE-TOUCH KEY-33 | ONE-TOUCH KEY-34 | ONE-TOUCH KEY-35 | ONE-TOUCH KEY-36 |

| ABBREV DIAL 00 | ABBREV DIAL 01 | ABBREV DIAL 02 | ABBREV DIAL 03 |
|---|---|---|---|
| : | : | : | : |
| : | : | : | : |
| : | : | : | : |
| ABBREV DIAL 96 | ABBREV DIAL 97 | ABBREV DIAL 98 | ABBREV DIAL 99 |

| BIT NO. | CONTENTS OF NEW NSS |
|---|---|
| 1～16 | CCITT MEMBER'S CODE (0000 0000 0000 0000) |
| 17～24 | MAKER CODE LSB (1000 1000) MSB |
| 25～32 | NSS CODE LSB (0100 0000) MSB |
| 33、34、35、36<br>0、0、0、0<br>0、1、0、0<br>1、0、0、0<br>1、1、0、0<br>0、0、1、0<br>0、1、1、0<br>1、0、1、0<br>1、1、1、0<br>0、0、0、1<br>0、1、0、1<br>1、0、0、1<br>1、1、0、1<br>0、0、1、1<br>0、1、1、1<br>1、0、1、1<br>1、1、1、1 | DATA SIGNAL SPEED<br>2400 bits/s V. 27ter<br>4800 bits/s V. 27ter<br>9600 bits/s V. 29<br>7200 bits/s V. 29<br>14400 bits/s V. 33<br>12000 bits/s V. 33<br>9600 bits/s V. 33<br>7200 bits/s V. 33<br>RESERVED<br>RESERVED<br>RESERVED<br>RESERVED<br>RESERVED<br>RESERVED<br>RESERVED<br>RESERVED |
| 37 | IMAGE FRAME SIZE 0 : 256 1 : 64 OCTET |
| 38 | RESERVED |
| 39 | RESERVED |
| 40 | EXTENSION BIT |

FIG. 7

| BIT NO. | CONTENTS OF CONVENTIONAL NSS |
|---|---|
| 1～16 | CCITT MEMBER'S CODE (0000 0000 0000 0000) |
| 17～24 | MAKER CODE LSB (1000 1000) MSB |
| 25～32 | NSS CODE LSB (0000 0001) MSB |
| 33～40 | POLLING ID LSB (0000 0000) MSB |
| 41、42<br>0、0<br>1、0<br>0、1<br>1、1 | MIN TRANSMISSION TIME OF ALL WHITE LINES IN STANDARD MODE<br>20ms<br>5ms<br>10ms<br>15ms |
| 43、44<br>0、0<br>1、0<br>0、1<br>1、1 | MIN TRANSMISSION TIME OF ALL WHITE LINES IN FINE MODE<br>20ms<br>5ms<br>10ms<br>15ms |
| 45～47 | 0 (FIXED) |
| 48 | EXTENSION BIT |
| 49 | ABBREV USER'S NAME EXISTENT |
| 50 | SEND TEL NUMBER AS IMAGE DATA |
| 51 | EXECUTE BUFFER TRANSMISSION IN IMAGE TRANSMISSION |
| 52 | WAIT FOR DCS WITHOUT SENDING DIS AT MODE CHANGE |
| 53 | MAKE CALLING TIME VARIABLE |
| 54 | SEND 16 PELS IN SCAN DIRECTION |
| 55 | EXTENSION BIT |
| 56 | 0 (FIXED) |
| 57～64 | NUMBER OF OCTETS OF ABBREV USER'S NAME 16(FIXED) |
| 65～192 | ABBREV USER'S NAME DATA |
| 193～200 | NUMBER OF OCTETS OF BUFFER SIZE AT BUFFER TRANSMISSION 02(FIXED) |
| 201～216 | BUFFER SIZE AT BUFFER TRANSMISSION |
| 217～224 | NUMBER OF OCTETS OF CALLING TIME 01(FIXED) |
| 225～232 | CALLING TIME DATA |

FIG. 20

DATA COMMUNICATION APPARATUS

This application is a continuation of application Ser. No. 07/857 313 filed Mar. 25 1992, now abandoned.

BACKGROUND OF THE INVENTION

1. Field of the Invention

The present invention relates to a data communication apparatus for communicating data, particularly image data.

2. Related Background Art

A facsimile device has been known as one of such apparatus. In the prior art facsimile device, a communication standard such as a G3 standard has been defined by CCITT and a communication sequence is conducted in accordance with the communication standard to communicate image data.

A transmitter which meets G3 standard with ECM (error correction communication mode) is first explained.

When the transmitter receives nsf (non-standard facilities), csi (called subscriber identification) and dis (digital identification signal) signals by a V21 modem (300 bps) of a receiver, it transmits nss (non-standard facilities set-up), tsi (transmitting subscriber identification) and dcs (digital command signal) signals by a V21 modem in the transmitter, followed by TRAINING and TCF (training check) by a high speed modem (9600 bps, 7200 bps, 4800 bps and 2400 bps). After the transmission of TRAINING and TCF by the high speed modem, the transmitter receives responses by the V21 modem. When the transmitter receives fit (failure to train) as the response, it retransmits a signal such as dcs with a lower designation for a high speed modem speed and repeats the above procedure.

When the transmitter receives cfr (confirmation to receive) as the response to TRAINING and TCF, it successively transmits TRAINING, HDLC flag (01111110) pattern (preamble) of approximately 200 ms, HDLC framed image signal and three RCP signals by the high speed modem at the preset transmission rate.

After the transmission of the signals by the high speed modem, the transmitter sends a control signal pps-q ("pps" represents partial (or virtual) page signal and "q" represents eom, eop or mps) by the V21 modem. If the image signal is a partial page signal, the control signal pps-q is pps-null, if the image signal is an end page signal, it is pps-eop (end of procedure), if there is a next document and a mode change is required, it is pps-eom (end of message), and if no mode change is required, it is pps-mps (multi-page signal).

After the transmission of the control signal pps-q, the transmitter receives a response by the V21 modem. If the transmitter receives ppr (partial page request) as the response, it retransmits the frame requested by the ppr by the high speed modem and continues the procedure.

If the transmitter receives mcf (message confirmation) as the response, it transmits TRAINING and the preamble followed by a partial page image signal by the high speed modem if the pps-q signal previously transmitted is pps-null. If it is pps-eop, the transmitter transmits a dcn signal by the V21 modem and then opens the line to terminate the communication. If it is pps-eom, the transmitter returns to a phase B to receive dis by the V21 modem. If it is pps-mps, the transmitter transmits TRAINING and the preamble followed by a next page image signal by the high speed modem. The preamble period of the signal by the V21 modem is one second.

A receiver which meets a G3 standard with an ECM function is now explained.

When the receiver is called, it transmits CED followed by nsf, csi and dis by the V21 modem. After the transmission of the signals including dis, the receiver receives nss, tsi and dcs signals by the V21 modem. After the reception of the signals including dcs, the receiver receives a TCF signal by the high speed modem in accordance with the speed information in the dcs signal. If the receiver does not correctly receive TCF, it transmits ftt by the V21 modem and then receives the signals including dcs again by the V21 modem. If the receiver correctly receives TCF, it transmits cfr by the V21 modem and receives an image signal by the high speed modem having the same rate as that of TCF.

After the reception of the image signal, the receiver receives at least one RCP continuously by the high speed modem and escapes from the high speed signal reception mode. After the reception of the high speed signal, the receiver receives pps-q by the V21 modem. After the reception of the pps-q signal, the receiver transmits a ppr signal to request to the transmitter the retransmission of an error frame if the error frame is included in the image signal received immediately previously, and it is set to the reception mode of the image signal by the modem having the same rate as that of the immediately previous image signal. If no error frame is included in the image signal received immediately previously, the receiver transmits an mcf signal by the V21 modem and conducts the following operation in accordance with the pps-q signal received immediately previously.

If the pps-q signal is pps-null, the receiver receives the image signal of the next partial page by the modem having the same rate as that of the immediately previous image signal and continues the sequence.

If the pps-q signal is pps-eom, the receiver returns to the phase B after T2 (six seconds) period and transmits the signals including dis by the V21 modem.

If the pps-q signal is pps-mps, the receiver receives the image signal of the next page by the modem having the same rates as that of the immediately previous image signal and continues the sequence.

If the pps-q signal is pps-eop, the receiver receives a dcn (disconnect) signal by the V21 modem and opens the line to terminate the communication.

The preamble period of the signal by the V21 modem is one second. FIG. 19 shows the normal communication sequence described above.

The improvement of quality of the public network since the basic communication protocol described above has been defined is remarkable and the existing communication protocol includes much waste for many currently available networks and takes a long communication time.

A recent G3 facsimile device includes many added functions, and nss and dcs are very long to attain those functions. As a result, the communication time is long.

1. Too much time is required to transmit nss and dcs by the V21 modem.

2. It is almost unnecessary to confirm the line status by TCF and cfr.

3. It is not necessary to transmit three RCP's.

4. It is not necessary to transmit the pps-q signal by the V21 modem.

Facsimile devices having the ECM function are disclosed in U.S. Pat. No. 5,031,179 (issued on Jul. 9, 1991), U.S. Pat. No. 5,075,783 (issued on Dec. 24, 1991) and U.S. patent application Ser. No. 371,847 (filed on Jun. 27, 1989), abandoned. Technique to reduce the communication protocol time is disclosed in U.S. Pat. No. 4,910,506 (issued on Mar. 20, 1991), which reduces the time by eliminating the communication of the protocol signal.

SUMMARY OF THE INVENTION

It is an object of the present invention to improve a data communication apparatus in the light of the above problems.

It is another object of the present invention to reduce a total communication time by communicating a communication protocol signal which is normally transmitted by a low speed modem, by a high speed modem for data.

It is still another object of the present invention to reduce a total communication time by communicating a communication protocol signal which is normally communicated by a low speed modem, by a high speed modem for data and secure the communication by shifting the communication of the communication protocol signal by the low speed modem when the communication of the communication protocol signal by the high speed modem fails.

Other objects of the present invention will be apparent from the following description of embodiments and the accompanying drawings.

BRIEF DESCRIPTION OF THE DRAWINGS

FIG. 7 shows a format of NSS used in the embodiment, FIG. 20 shows a format of a normal NSS.

DETAILED DESCRIPTION OF THE PREFERRED EMBODIMENTS

One embodiment of the present invention is now explained with reference to the drawings.

A protocol newly proposed in the present invention is referred to as an abbreviated protocol.

Figure 1:
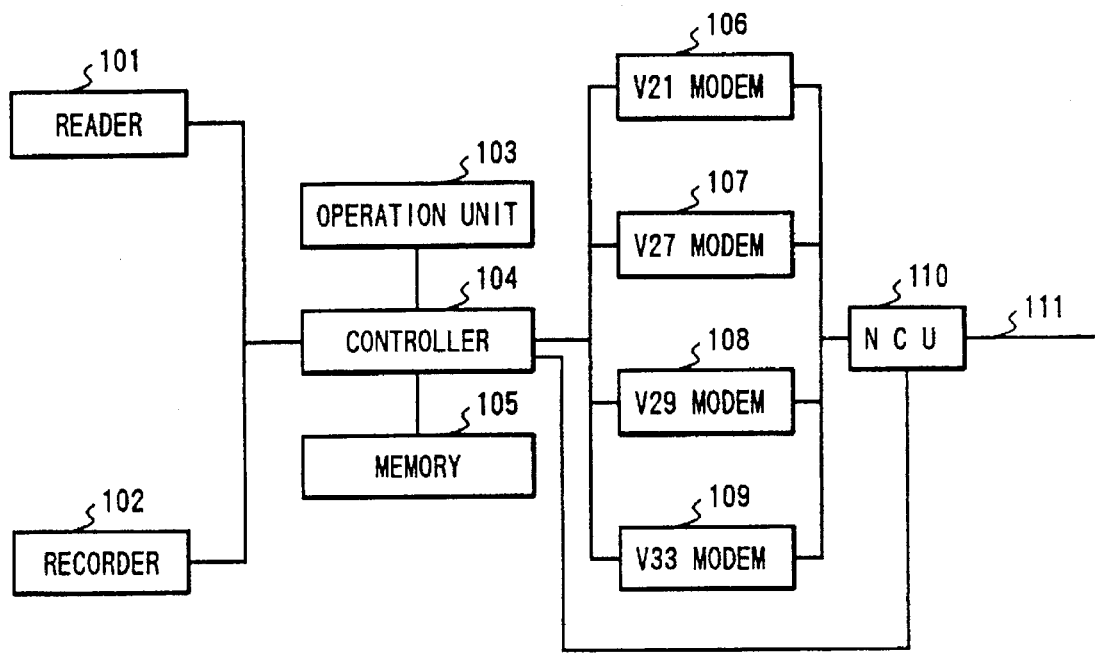
FIG. 1 shows a block diagram of a facsimile device in accordance with one embodiment.

FIG. 1 shows a block diagram of a basic configuration of a facsimile device in one embodiment. Numeral 101 denotes a reader for reading a document image, which comprises a reader for reading the document image by a CCD line sensor (or a contact sensor).

Numeral 102 denotes a recorder for recording an image signal. It comprises a thermal printer for recording the image signal on a thermal paper by a thermal head, an electrophotographic printer or an ink jet printer (for example, a bubble jet type ink jet printer which generates bubbles by heat to discharge ink).

Numeral 103 denotes a console unit which comprises various key entry switches such as one-touch dialing keys and a ten-key, a key entry scan circuit therefor and a liquid crystal display (LCD) for displaying various information including apparatus status. The apparatus is operated by the console unit 103.

Numeral 104 denotes a controller for controlling the entire apparatus. It comprises a microcomputer and peripheral devices thereof such as a read-only memory (ROM) for storing a control program and a random access memory (RAM) for temporarily storing various data. The controller 104 encodes and decodes the image signal (MH, MR or MMR system) and controls the communication sequence.

Numeral 105 denotes a memory for registering telephone numbers and abbreviations for the one-touch dialing keys and the abbreviation dialing keys provided on the console unit 103. In the present embodiment, it stores information for 36 one-touch dialing keys and 100 abbreviation dialing keys. The memory 105 also stores information on communication modes of destination stations corresponding to the dial members, information as to whether the destination stations have functions of abbreviation procedure to be described below and flag information for the abbreviation protocol.

Numeral 106 denotes a V21 modem (300 bps) of the CCITT Recommendation, which is used to communicate a normal protocol signal.

Numeral 107 denotes a V27 ter modem (4800 bps, 2400 bps) of the CCITT Recommendation.

Numeral 108 denotes a V29 modem (9600 bps, 7200 bps, 4800 bps, 2400 bps) of the CCITT Recommendation.

Numeral 109 denotes a V33 modem (14400 bps, 12000 bps, 9600 bps) of the CCITT Recommendation.

The V27 ter modem 107, the V29 modem 108 and the V33 modem 109 are used for the communication of an image signal.

Numeral 110 denotes a network controller which captures a line 111 and it comprises a CI detection circuit for detecting a call signal (a 16 Hz call signal and a 1300 Hz call signal) from the line 111, a dialing circuit for dialing to the line 111 in accordance with telephone number data from the controller 104, and a relay circuit for forming a DC loop of the line 111.

An abbreviated procedure transmitter is first explained.

Signals to be communicated by the high speed modem (the modem for the image signal) are shown by upper case alphabet characters while signals to be communicated by the 300 bps modem are shown by lower case alphabet characters.

Figure 2:
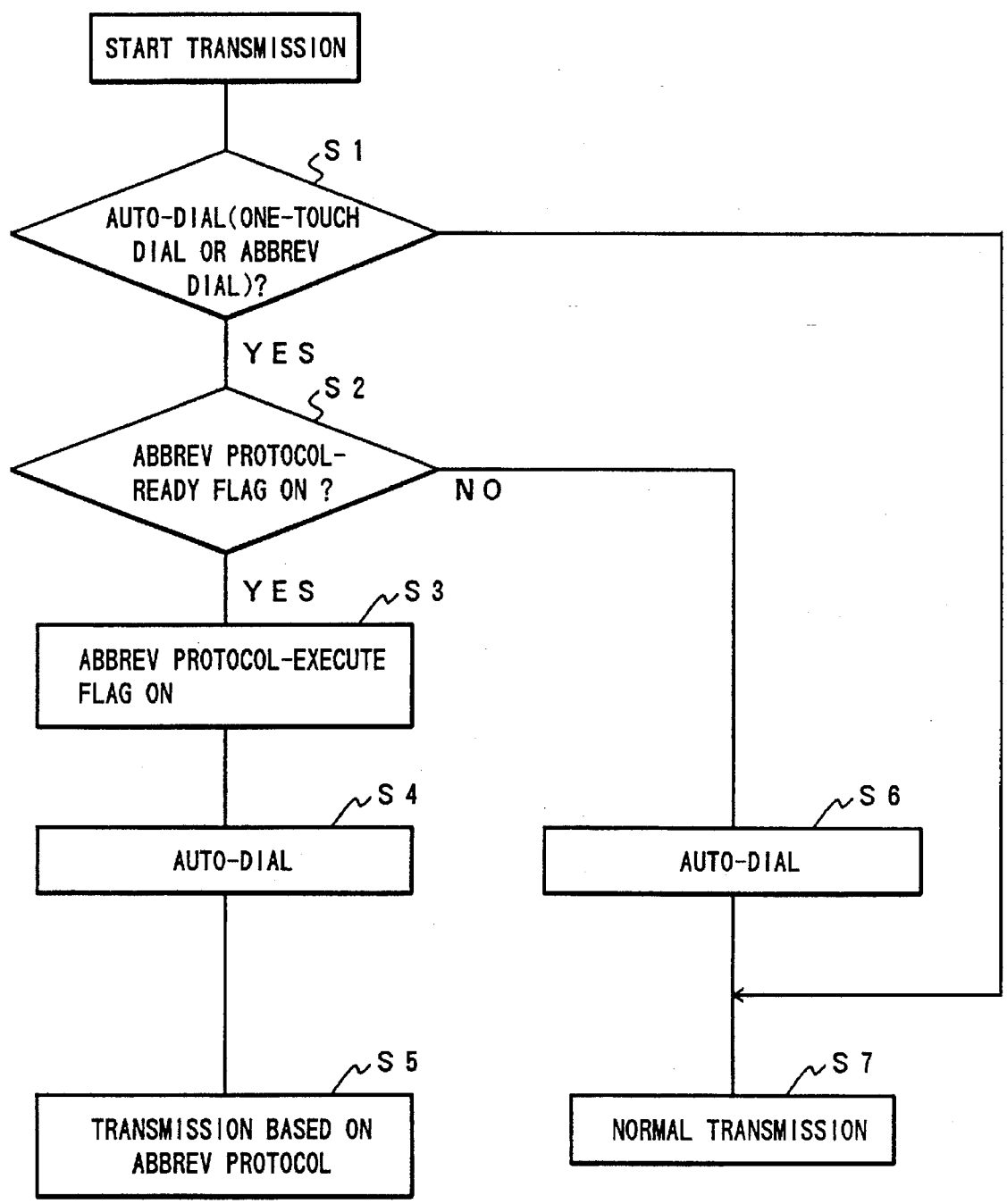
FIG. 2 shows a flow chart of a control operation in a transmission call mode in the embodiment.

FIG. 2 shows a flow chart of a control operation in a transmission mode of the controller 104.

In a step S1, whether the auto-dialing call by the one-touch dial or the abbreviation dial has been made or not is determined, and if it has been done, the process proceeds to a step S2, and if manual call by the ten-key has been made, the process proceeds to a step S7 to transmit in accordance with a normal communication sequence of the CCITT recommendation.

Figure 6:
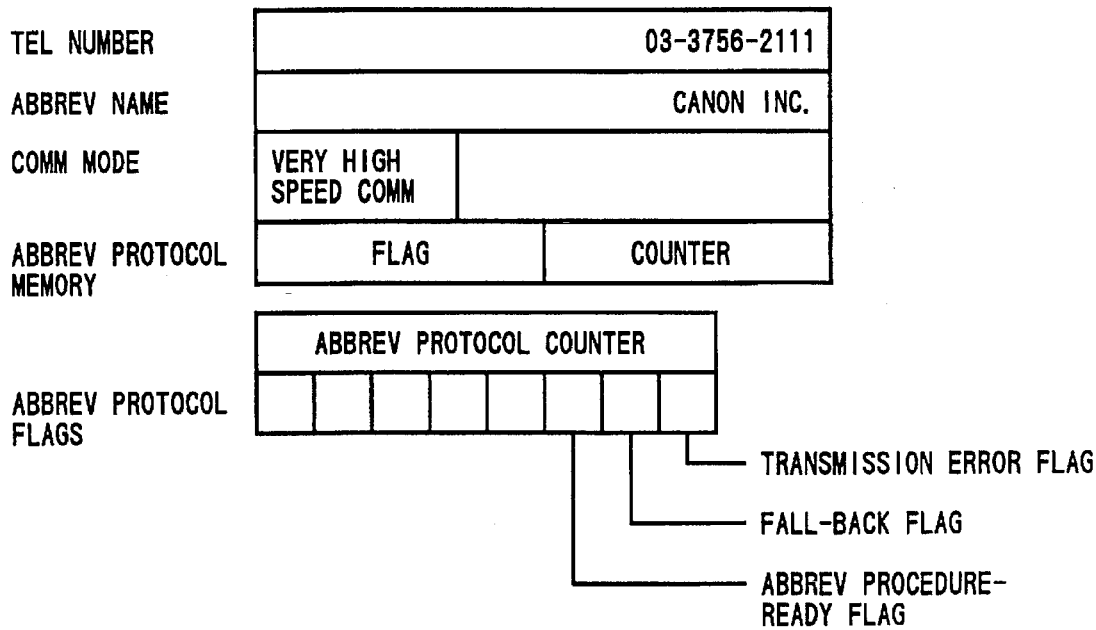
FIG. 6 shows a format of a memory 105.

Telephone numbers and past communication histories for the one-touch dials and the abbreviated dials have been stored in the memory 105. In the step S2, whether an abbreviation protocol ready flag of an abbreviation protocol counter for the number to be called shown in FIG. 6 is "1" or not is determined. If the flag is "0", the auto-dialing call is made in a step S6 and normal communication is made in a step S7. If the abbreviation protocol ready flag is "1", an abbreviation protocol execution flag in the controller 104 is set in a step S3, the auto-dialing call is made in a step S4, and an image transmission routine (FIG. 4) by the abbreviation protocol is started in a step S5.

Figure 4:
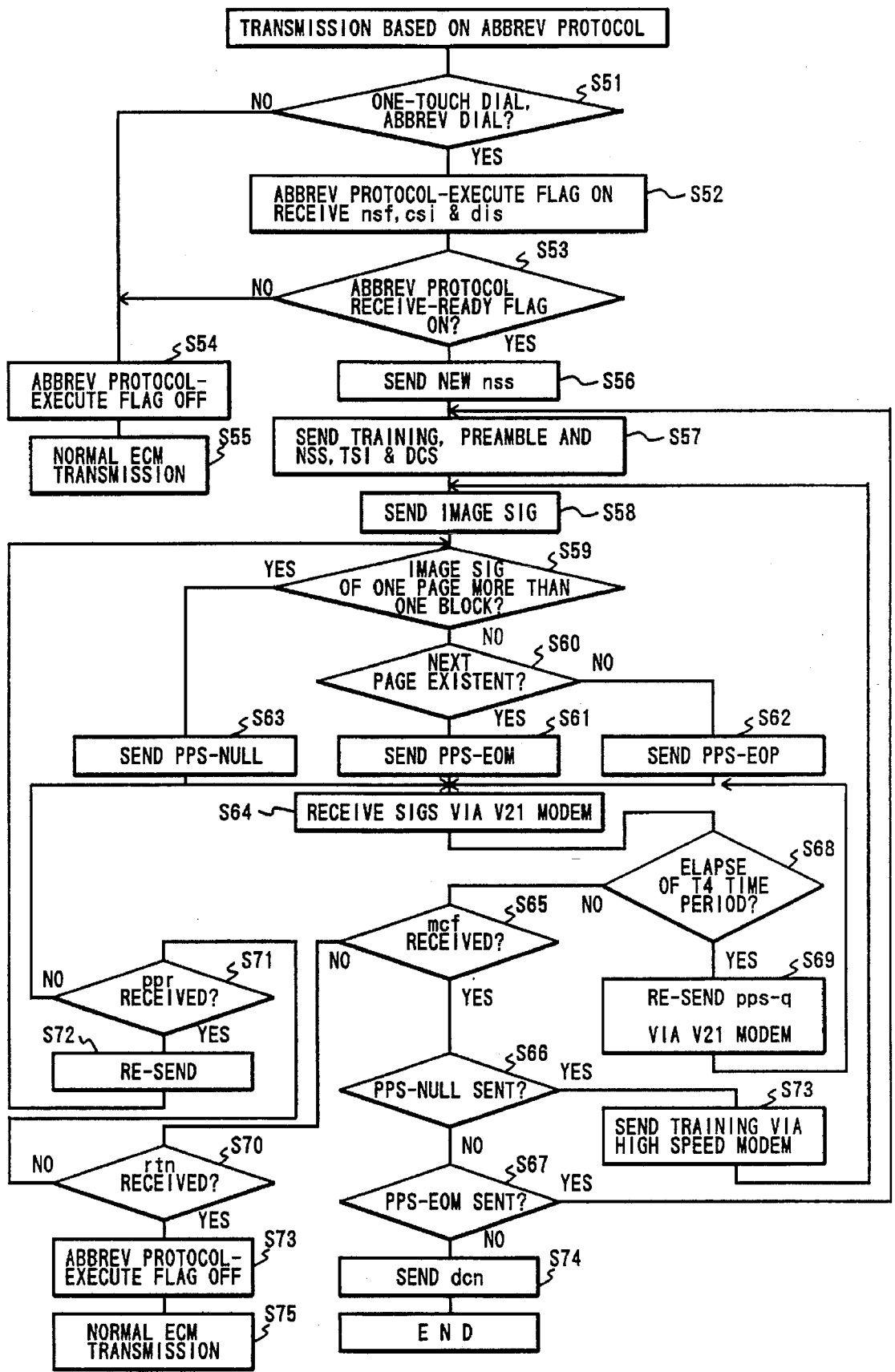
FIG. 4 shows a flow chart of a control operation in a transmission mode in the embodiment.

FIG. 4 shows a flow chart of the image transmission protocol routine by the abbreviation protocol.

In a step S51, whether the auto-dialing call by the one-touch dial or the abbreviation dial has been made or not is determined, and if the auto-dial call by the one-touch dial or the abbreviation dial has not been made, the abbreviation protocol execution flag is set to "0" (OFF) in a step S54, and if the abbreviation protocol execution flag is "0", nss, tsi and dcs are transmitted by the V21 modem to continue the normal ECM transmission or G3transmission. Then, a conventional protocol is carried out.

If the auto-dialing call by the one-touch dial or the abbreviation dial has been made, the process proceeds to a step S52 to call by the V21 modem 106 and then receive nsf, csi and dis signals transmitted from the destination station. In a step S53, whether the abbreviation protocol reception flag in the nsf signal of the nsf, csi and dis signals is "1" (ON) or not is determined, and if it is "0", the abbreviation protocol execution flag is set to "0" in a step S54 and the process proceeds to a step S55. If the abbreviation protocol reception flag is "1", the transmission is continued while the abbreviation protocol execution flag is kept "1", and in a step S56, nss for the abbreviation protocol which is different from a conventional nss as shown in FIG. 7 is transmitted at 300 bps for a preamble period of 200 ms. In a step S57, after approximately 70 ms non-signal period since nss for the abbreviation protocol has been transmitted, the transmission of a training signal is started by a high speed modem other than the V21 modem 106 (which is one of the V27 ter modem 107, the V29 modem 108 and the V33 modem 109, and the modem and the transmission speed are selected in accordance with the information of the communication mode of the destination-station corresponding to the calling telephone number). After the transmission of the training signal, HDLC flag (01111110) pattern (preamble) of approximately 200 ms is transmitted, and control signals NSS, TSI and DCS which are identical to those transmitted by the V21 modem at 300 bps in the prior art are transmitted by the selected high speed modem.

In a step S58, an image signal is transmitted, following to the control signal, by the HDLC framing which is identical to that of the normal ECM. One block (64k bytes) of image signal is transmitted, and in a step S59, if it is determined that one page of actual document image signal is more than one block (resulting in a partial page), PPS-NULL is transmitted by the selected high speed modem in a step S63. If one page of actual document image signal is within one block, and in a step S60, if it is determined that there is next page document image, PPS-EOM is transmitted by the selected high speed modem. In the step S60, if it is determined that there is no next page, PPS-EOP is transmitted through the high speed modem. In the steps S59 to S62, PPS-EOP is transmitted by the high speed modem as the PPS-Q signal following to the image signal if the image signal is for the end page, PPS-EOM is transmitted without regard to the mode change if there is next page document, and PPS-NULL is transmitted if the partial page is included. After the transmission of the PPS-Q signal, the normal RCP signal is not transmitted and the transmission of the signal by the selected high speed modem is terminated.

After the transmission of the signal by the high speed modem, a signal at 300 bps is received by the V21 modem 106 by T4 period (3 seconds), in a step S64. If the 300 bps signal is not received in the T4 period (step S68), the PPS-Q signal previously transmitted by the high speed modem is retransmitted by the V21 modem 106 with the preamble period of 200 ms in a step S69, and the signal at 300 bps is again received for the T4 period (3 seconds) in the step S64.

If the 300 bps mcf signal is received in the T4 period in a step S65 and if the PPS-Q signal previously transmitted is determined as PPS-EOP in a step S67, a dcn signal with the preamble period of 200 ms is transmitted by the V21 modem in a step S74 and the line is opened to terminate the transmission. If it is determined that the previously transmitted PPS-Q signal is PPS-EOM in the step S67, the process returns to the step S57 where the training signal and the preamble are transmitted by the high speed modem followed by the control signals NSS, TSI and DCS and the image signal of the next page. If it is determined that the previously transmitted PPS-Q signal is PPS-NULL in the step S66, the training signal and the preamble are transmitted by the high speed modem in a step S73, and the process returns to the step S58 where the image signal of the next partial page is transmitted without transmitting the control signal.

If ppr is received in a step S71, the training signal and the-preamble are transmitted by the selected high speed modem in a step S72 as they are in the normal ECM, and then an error frame designated by FIF of ppr is retransmitted without transmitting the control signal. Then, the process returns to the step S59.

If rtn is received in the step S70, it is determined that the receiver did not receive at least one of the 300 bps nss, the high speed NSS or the high speed DCS. The abberation protocol-execution flag is set to "0" in a step S73, and the 300 bps nss, tsi and dcs signals are transmitted by the V21 modem 106 in a step S75 to continue the normal ECM transmission. The first image block of ECM retransmits the image block previously transmitted by the abberation protocol, and the process does not return to the abberation protocol thereafter.

In the image signal transmission in the abberation protocol, if the number of times of ppr transmission from the receiver for one image block exceeds a predetermined number, ctc is transmitted, and after the ctc transmission, the abberation protocol execution flag is set to "0" to move to the normal ECM transmission and the process does not return to the abberation protocol thereafter. The preamble period for the ctc signal is one second as it is in the normal ECM.

The reception of the image signal by the abberation protocol is now explained.

Figure 5:
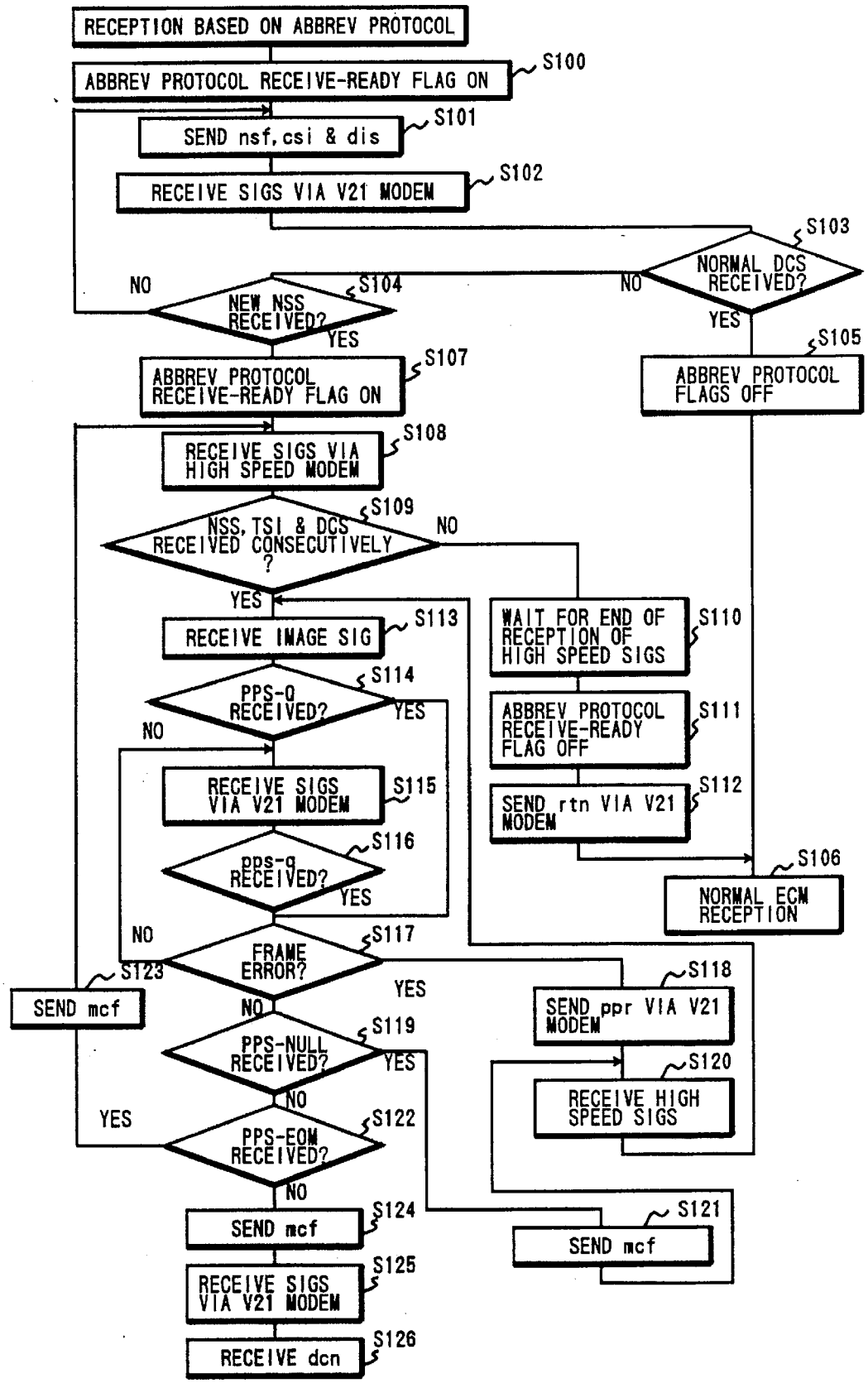
FIG. 5 shows a flow chart of a control operation in a reception mode in the embodiment.

FIG. 5 shows a flow chart of an image signal reception routine by the abbreviation protocol.

When a call from the line 111 is detected, the abbreviation protocol receive flag in nsf is set to "1" and CED is transmitted and then nsf, csi and dis are transmitted by the V21 modem 106 with the preamble period of 1 second in steps S100 and S101. In steps S102, S103 and S104, after the transmission of nsf, csi and dis, the 300 bps signal is received by the V21 modem 106. In a step S103, if the normal nss, tsi and dcs having the format shown in FIG. 20 are received, the abberation protocol reception flag and the abberation protocol execution flag (in the RAM) of the controller 104 are set to "0" in a step S105. In a step S106, the normal ECM or G3reception is conducted in accordance with the direction from the transmitter. Thereafter, the process does not return to the abberation protocol during the same communication.

When the abbreviation protocol nss (new nss) having the format shown in FIG. 7 is received in a step S104, the abberation protocol execution flag in the controller 104 is turned on in a step S107. In a step S108, one of the high speed modems V27 ter modem 107, V29 modem 108 and V33 modem 109 is selected in accordance with the speed signal in nss and the high speed signal is received by the high speed modem. After the reception of the training signal of the high speed signal, whether the control signals NSS, TSI and DCS have been continuously received by the same high speed modem or not is determined in a step S109. The image signal is not received until both control signals NSS and DCS are correctly received by the high speed modem. If the control signal NSS or DCS is not correctly received by the end of the high speed signal, the high speed signal is terminated in a step S110, the abbreviation protocol reception flag and the abbreviation protocol execution flag in the controller 104 are set to "0" in a step S111, the rtn signal having the preamble period of one second is transmitted by the V21 modem 106 in a step S112, and the normal ECM reception is started in the step S106. Thereafter, the process does not return to the abberation protocol during the same communication.

If both control signals NSS and DCS are correctly received by the high speed modem in a step S109, the image signal of the frame data of the HDLC format which is identical to that of the normal ECM is continuously received by the high speed modem in a step S113. After the reception of the image signal, whether PPS-Q has been continuously received by the same high speed modem or not is determined in a step S114. After the reception of PPS-Q, the reception of the high speed signal is terminated. In a step S117, the presence or absence of an error (a frame error) in the received image signal is determined, and if any frame error is detected, ppr having the preamble period of 200 ms (ppr having the error frame number set) is transmitted as a response by the V21 modem 106 in a step S118.

PPS-Q is received by the high speed modem, and if the received PPS-Q is determined as PPS-NULL in a step S119, the mcf signal is transmitted by the V21 modem 106 in a step S121, and the high speed signal by the previously selected high speed modem is received in a step S120. Then, the process returns to the step S113.

PPS-Q is received by the high speed modem, and if the received PPS-Q is determined as PPS-EOM in a step S122, the mcf signal is transmitted by the V21 modem 106 in a step S123. Then, the process returns to the step S108 to receive the next block.

PPS-Q is received by the high speed modem and when the received PPS-Q is determined as PPS-EOP in a step S122, the mcf signal is transmitted by the V21 modem 106 in a step S124, and the 300 bps signal is received by the V21 modem 106 in a step S125. When the dcn signal is received by the V21 modem 106 in a step S126, the reception of the abbreviation protocol is terminated.

If the end of high speed signal is detected without receiving PPS-Q, the response is not transmitted but the 300 bps signal is received by the V21 modem 106 in a step S115.

After the transmission of the mcf signal in the steps S121 and S123, the apparatus stands by to receive either one of the 300 bps signal and the high speed signal as it does in the node F of the CCITT-T30 Recommendation.

If any error frame is included in the image signal, the ppr signal is transmitted and the retransmission of the error frame is received, and after the entire error frame has been correctly received, the mcf signal is transmitted.

If the ctc signal is received for the ppr signal, the abbreviation protocol reception flag and the abbreviation protocol execution flag in the controller are set to "0" and the normal ECM reception is started.

If the transmitter and the receiver are the facsimile devices of the present embodiment, the image signal is communicated by the abbreviation protocol.

Figure 3:
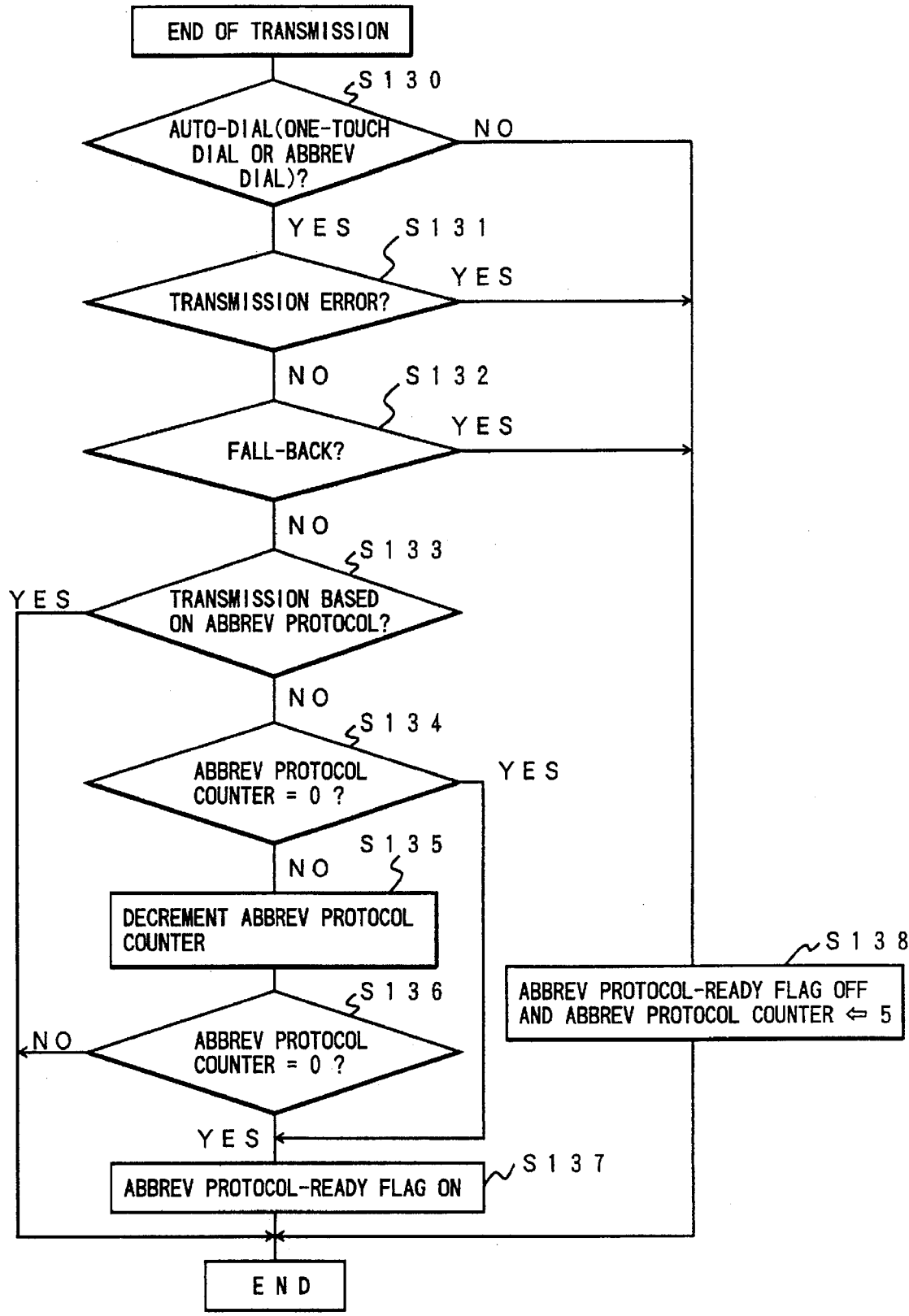
FIG. 3 shows a flow chart of a control operation at an end of transmission in the embodiment.

After the image transmission by the normal communication sequence and the image transmission by the abbreviation protocol described above are over, a routine shown in FIG. 3 is executed. FIG. 3 shows a flow chart of a routine after the transmission.

After the transmission, whether the call is by the auto-dialing by the one-touch key or the abbreviation dial or not is determined in a step S130, and if it is not the auto-dialing call, the abbreviation procedure permit flag is set to "0" in a step S138 and "5" is set in the abberation protocol counter. Then, the process after the transmission is terminated.

If the call is by the auto-dialing, whether any transmission error was included or not is determined in a step S131. If the transmission error is included, the abbreviation protocol ready flag of the corresponding one-touch dial or abbreviation dial is set to "0" in a step S138, and "5" is set in the abberation procedure counter.

If there is no transmission error in the step S131, the process proceeds to a step S132 to determine whether there is a fall-back of the transmission rate to the transmission rate of the communication mode information of the memory 105 shown in FIG. 6 corresponding to the one-touch dial or the abberation dial. If there is a fall-back, the abberation protocol ready flag of the corresponding one-touch dial or abberation dial is set to "0" in a step S138, and "5" is set in the abberation protocol counter. Then, the process after the transmission is terminated. If there is no fall-back, the process proceeds to a step S133 to determine whether the transmission is in the abberation protocol or not. If it is in the abberation protocol, it means that the abberation protocol ready flag has been set to "1" and the process after the transmission is terminated. The abberation protocol ready flag may be again set to "1" at this time. On the other hand, if the transmission is not in the abberation protocol in the step S133, whether the content of the abberation protocol counter is "0" or not is determined in a step S134. If it is "0", the abberation protocol ready flag of the corresponding one-touch dial or abberation dial is set to "1" in a step S137 and the process after the transmission is terminated. If the content of the abberation protocol counter is not "0", the abbreviation protocol counter is decremented in a step S135. After the decrement of the abberation protocol counter, whether the content of the abberation protocol counter is "0" or not is determined in a step S136. If it is not "0", the process after the transmission is terminated. If the content of the abbreviation protocol counter is "0" after the decrement in the step S136, the abberation protocol ready flag is set to "1" in a step S137 and the process after the transmission is terminated.

In this manner, if the normal image transmission at the transmission rate of the communication mode corresponding to the one-touch dial or the abberation dial succeeds continuously fine times (not limited to five times), the abberation protocol ready flag of the one-touch dial or the abbreviation dial is set to "1", and in the next transmission, the image transmission by the abberation protocol is automatically attempted. In this manner, the image transmission by the abberation protocol is automatically attained for a destination station which normally has good line status, and the image transmission by the normal communication procedure is conducted for a destination station which does not have good line status.

In the present embodiment, it is assumed that the image communication by ECM is conducted when the abberation protocol is executed although the present invention is not limited to the error retransmission by ECM. Specifically, the error document image may be retransmitted by any normal communication protocol if the communication by the abbreviation protocol fails.

FIGS. 8 to 18 show communication sequences in the present embodiment.

Figure 8:
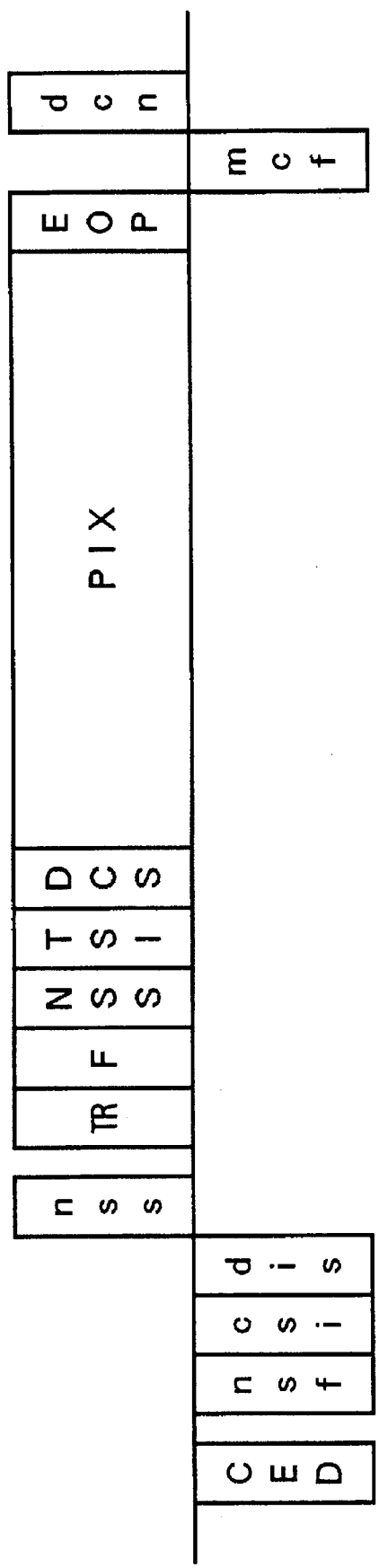
FIG. 8 shows a communication sequence in the embodiment.

FIG. 8 shows a communication sequence when the abbreviation protocol of the present embodiment is conducted with the amount of data of one page of document image being within one block (64k bytes) when one page of document image is to be transmitted (one-page communication without NULL). In FIG. 8, CED and 300 bps nsf, csi and dis are transmitted from the receiver to the transmitter, and 300 bps nss is transmitted from the transmitter, followed by the high speed training signal (TR), flag pattern (F), NSS, TSI, DCS, image data (PIX) and PPS-EOP. The 300 bps mcf is transmitted from the receiver and the 300 bps dcn is transmitted from the transmitter. Then, the communication sequence is terminated.

Figure 9:
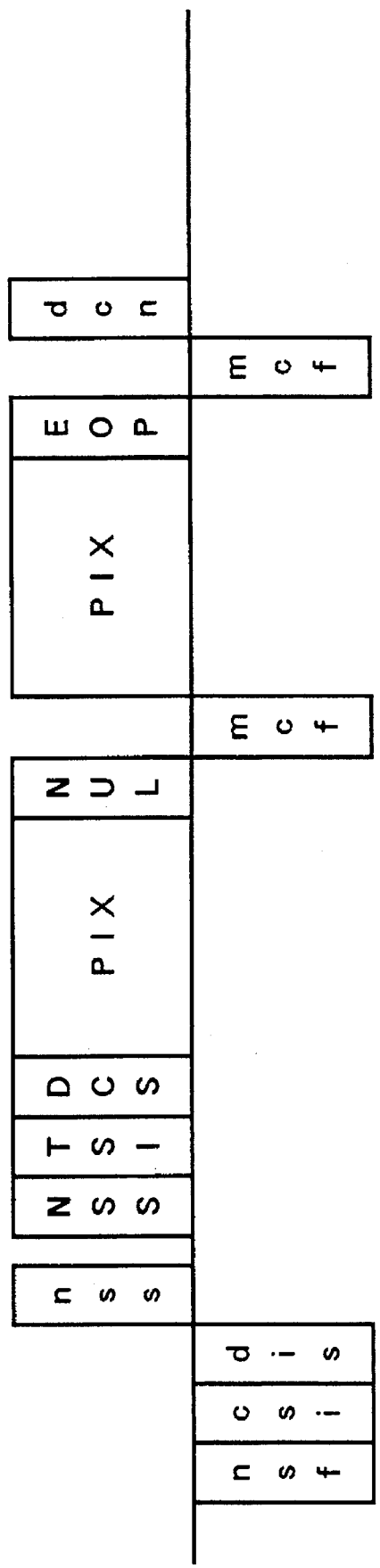
FIG. 9 shows a communication sequence in the embodiment.

FIG. 9 shows a communication sequence in the abberation protocol of the present embodiment when the amount of data of one page of document image is of two blocks when one page of document image is to be transmitted (one-page communication with NULL). In FIG. 9, high speed PPS-NULL is transmitted from the transmitter following to one block of image data (PIX) and the 300 bps mcf is transmitted from the receiver. The high speed image data (PIX) is again transmitted from the transmitter. Subsequent sequence is same as that of FIG. 8.

Figure 10:
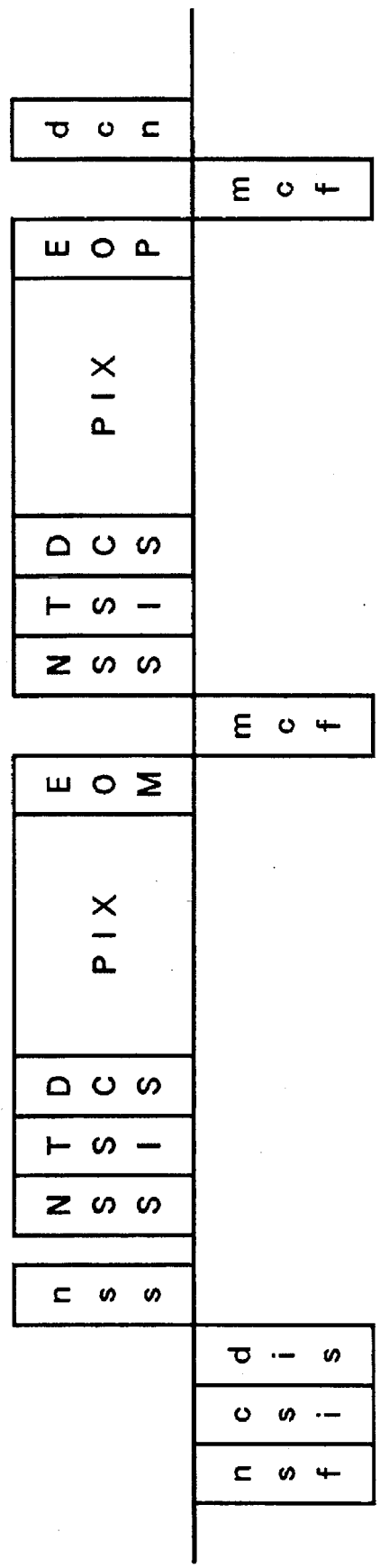
FIG. 10 shows a communication sequence in the embodiment.
Figure 11:
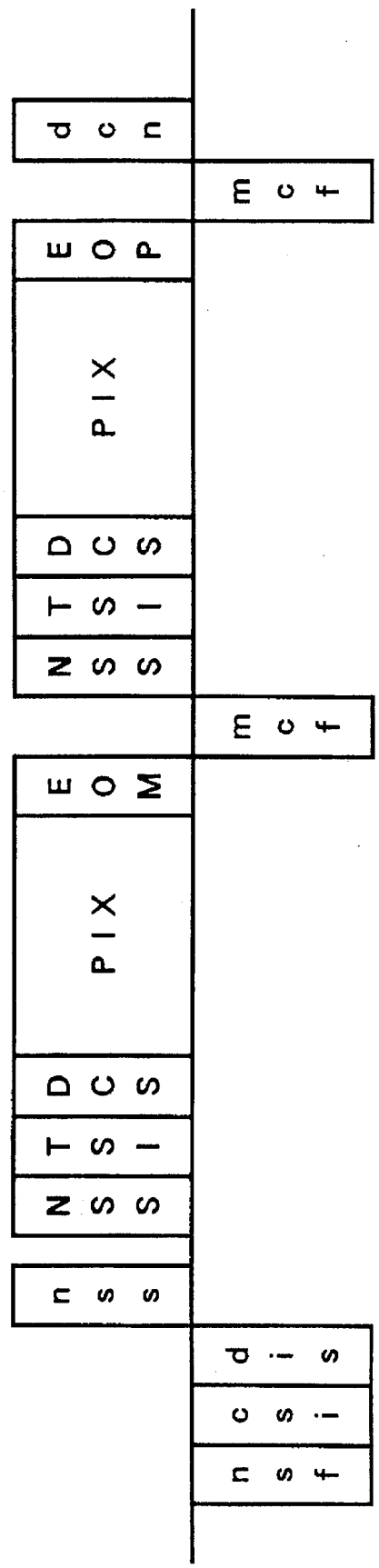
FIG. 11 shows a communication sequence in the embodiment.

FIG. 10 shows a communication sequence when the amount of data of each page of document images is within one block when two pages of document images are to be transmitted, and there is no change of communication mode between pages. (Two-page communication without NULL and mode change). FIG. 11 shows a communication sequence when there is a change of communication mode between pages. (Two-page communication without NULL and with mode change). In the present embodiments, the signals received and transmitted are identical because the transmitter transmits PPS-EOM even when there is not mode change.

Figure 12:
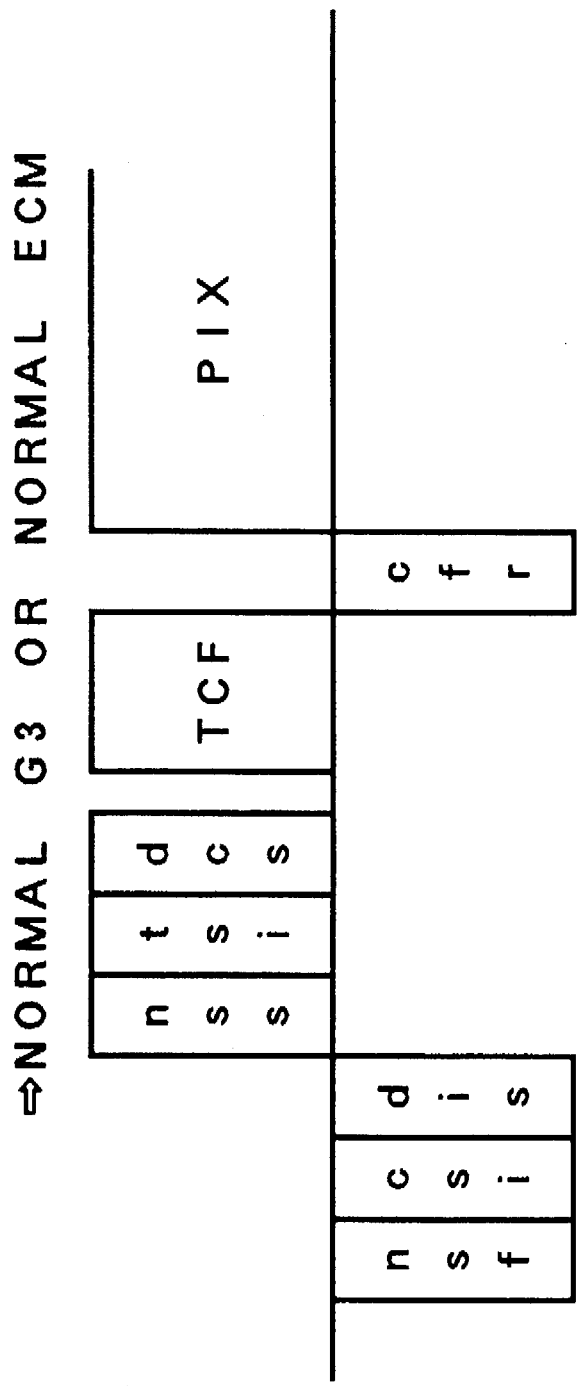
FIG. 12 shows a communication sequence in the embodiment.

FIG. 12 shows a communication sequence when the receiver rejects the communication in the abberation protocol from the beginning. (The abberation procedure receive bit is "0"). In this case, the communication is conducted by the normal G3procedure or the normal ECM procedure.

Figure 13:
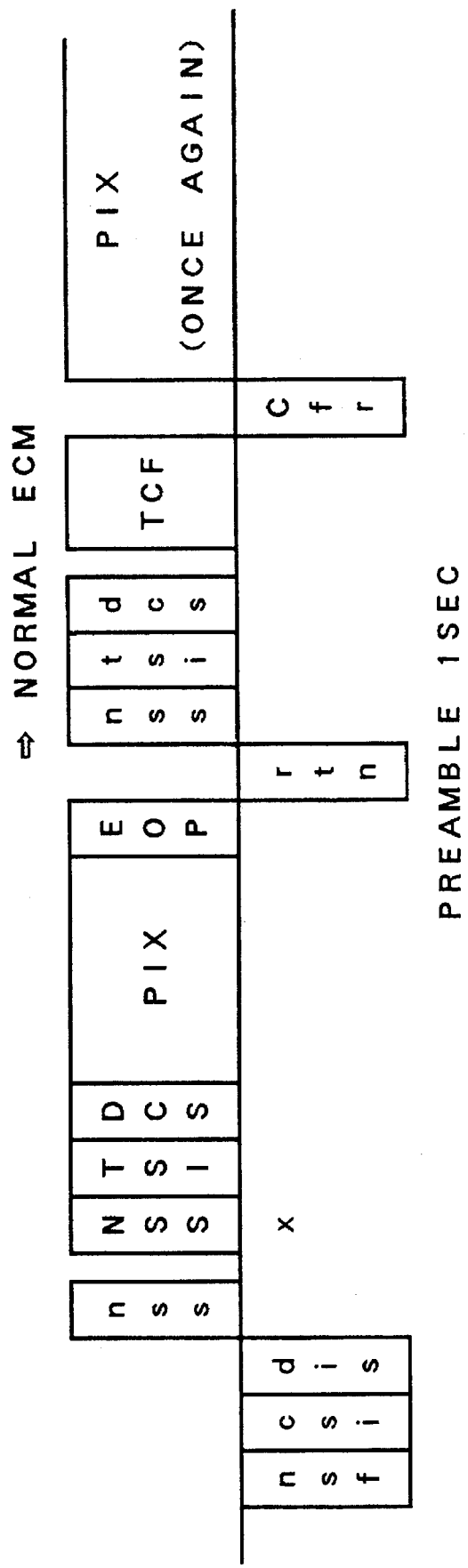
FIG. 13 shows a communication sequence in the embodiment.

FIG. 13 shows a communication sequence when the receiver cannot receive the high speed NSS or DCS. In this case, the 300 bps rtn is transmitted from the receiver. Subsequently, the communication is conducted by the normal procedure.

Figure 14:
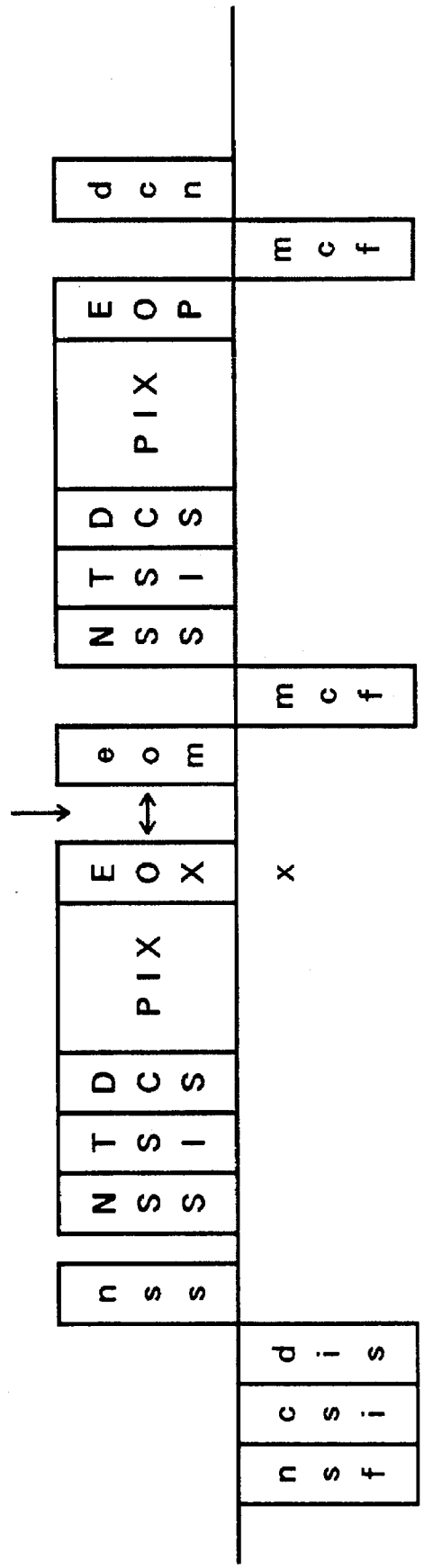
FIG. 14 shows a communication sequence in the embodiment.

FIG. 14 shows a communication sequence when the receiver cannot receive the high speed PPR-Q signal when two pages of document image is to be transmitted. In this case, the transmitter transmits the high speed PPS-Q signal (PPS-EOM in the present embodiment), and T4 (3 seconds) period later, it transmits the 300 bps pps-eom. When the 300 bps mcf is transmitted from the receiver, the transmitter continues the communication in the abberation protocol.

Figure 15:
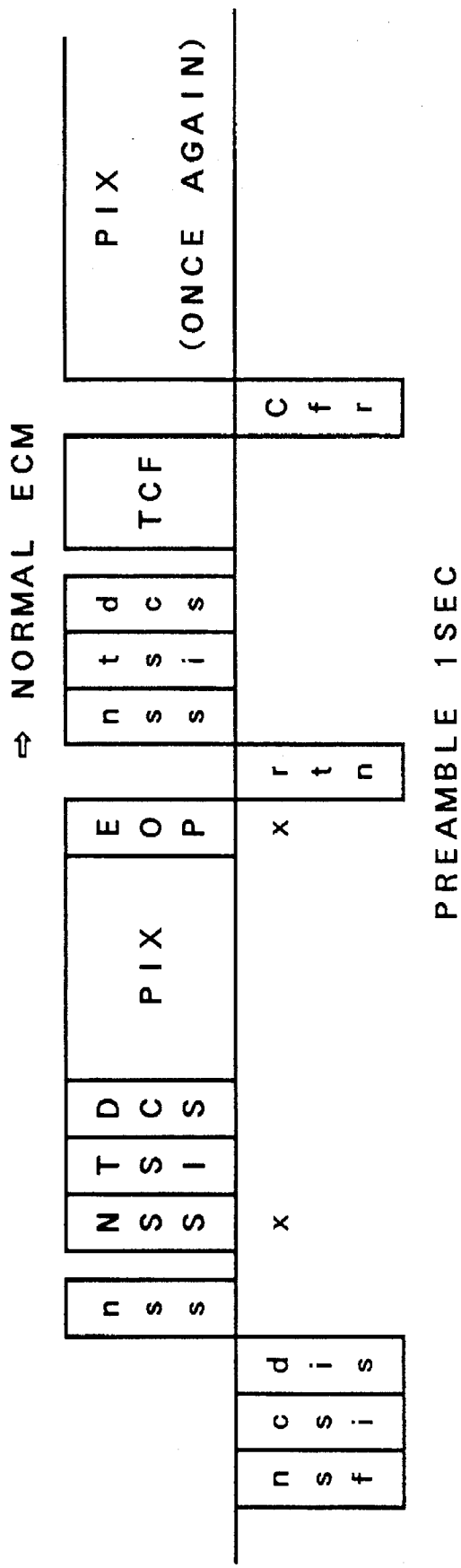
FIG. 15 shows a communication sequence in the embodiment.

FIG. 15 shows a communication sequence when the receiver cannot receive the high speed NSS (or DCS) and PPS-Q (PPS-EOP in the present embodiment). In this case, the communication is conducted in the normal protocol as it is in FIG. 13.

Figure 16:
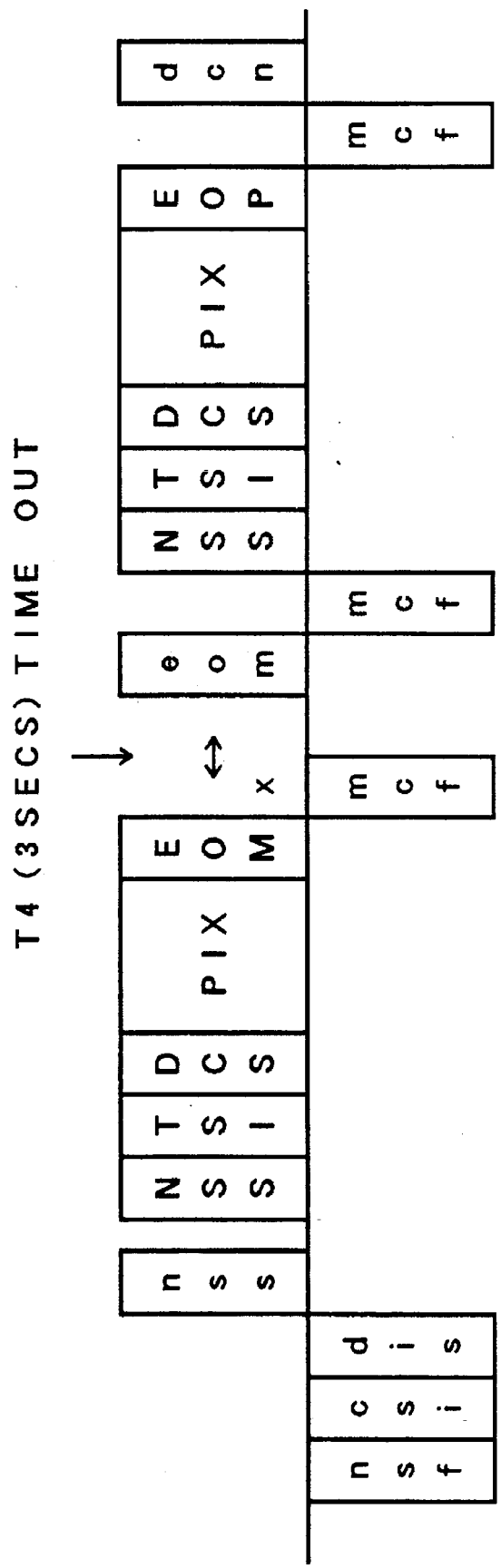
FIG. 16 shows a communication sequence in the embodiment.

FIG. 16 shows a communication sequence when the transmitter cannot receive the 300 bps mcf. In this case, the transmitter transmits PPS-EOM, and after T4 (3 seconds) period, it transmits the 300 bps pps-eom. When it receives the 300 bps mcf from the receiver, it continues the communication in the abberation protocol.

Figure 17:
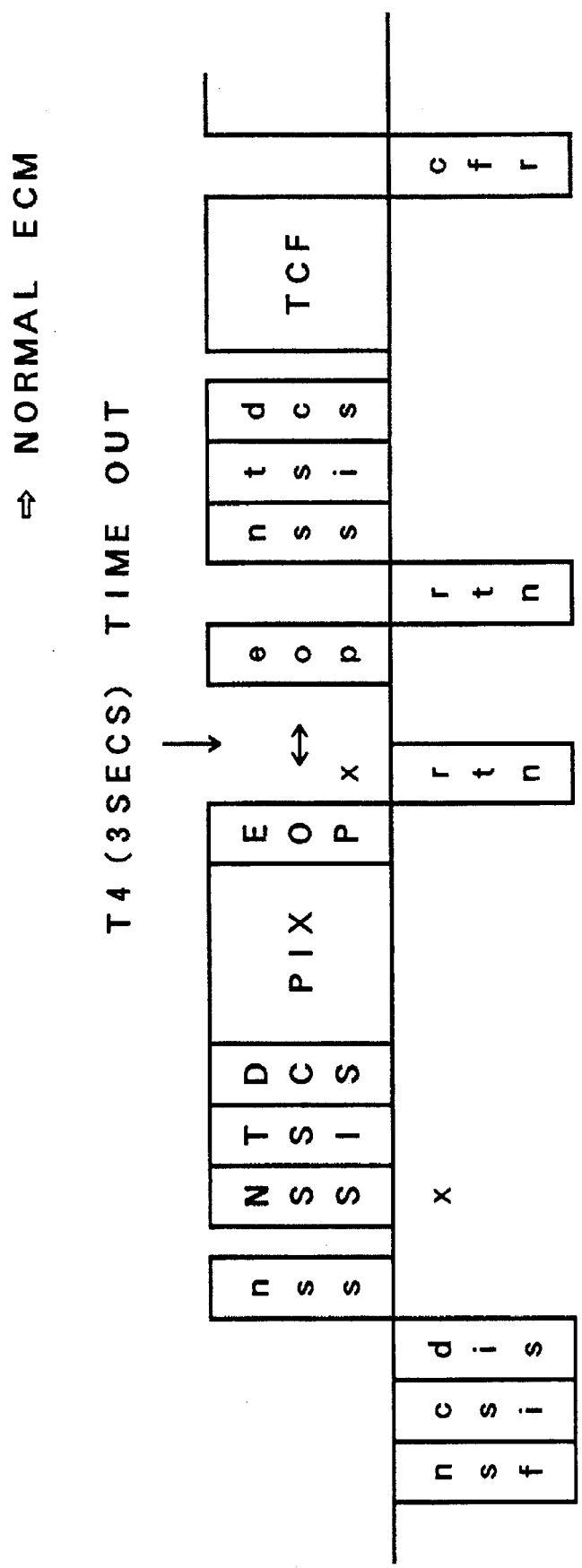
FIG. 17 shows a communication sequence the embodiment.

FIG. 17 shows a communication sequence when the receiver cannot receive the high speed NSS (or DCS) and the transmitter cannot receive the 300 bps rtn from the receiver. In this case, the transmitter transmits PPS-EOP, and after the TK (3 seconds) period, it transmits the 300 bps pps-eop, and when it receives the 300 bps rtn from the receiver, it conducts the communication in the normal protcol.

Figure 18:
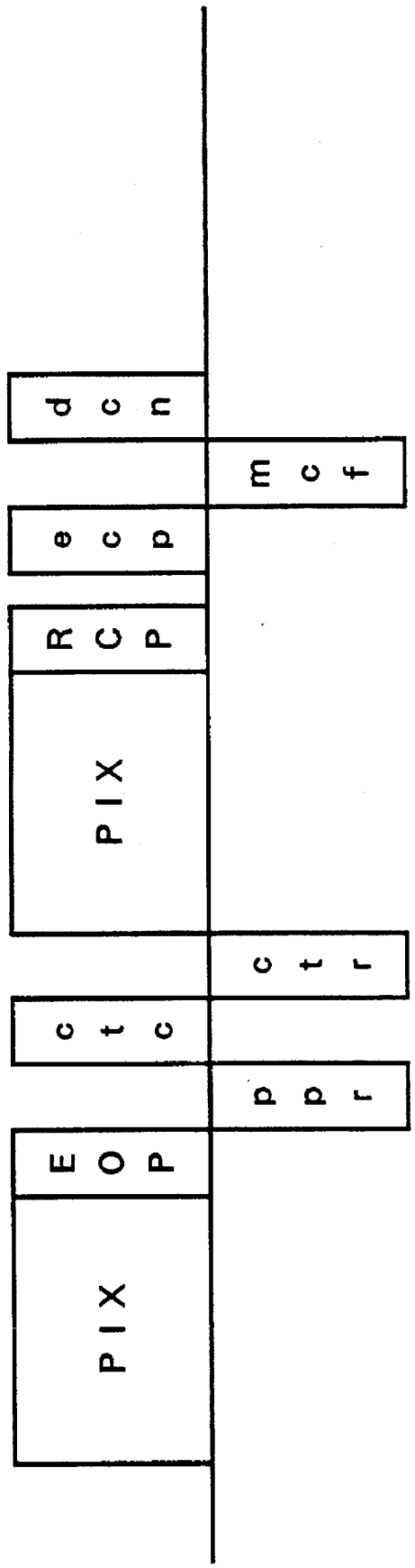
FIG. 18 shows a communication sequence in the embodiment.
Figure 19:
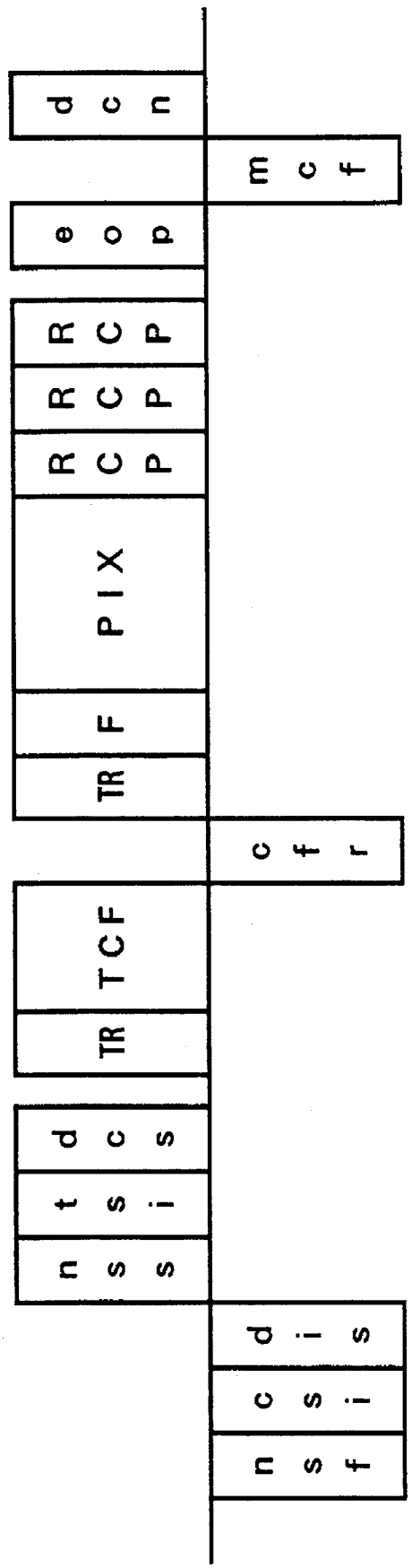
FIG. 19 shows a communication sequence in the prior art.

FIG. 18 shows a communication sequence when an error frame is included in the block data and the error frame was not eliminated during several times of retransmission (CTC transmission and reception). In this case, the transmitter transmits the 300 bps ctc, and when the receiver transmits the 300 bps ctr, it conducts the communication in the normal protocol.

The present invention is not limited to the embodiment described above but various modifications thereof may be made.

What is claimed is:

1. A data communication apparatus for communicating a communication protocol signal by a low speed modem and data by a high speed modem, comprising:

first communication means for communicating the protocol signal by said high speed modem; and second communication means for starting data communication by the high speed modem without reception of a signal by a modem different from the high speed modem after communication of the protocol signal by the high speed modem using said first communication means.

2. A data communication apparatus according to claim 1 wherein the protocol signal is communicated prior to the data communication.

3. A data communication apparatus according to claim 1 further comprising memory means for storing information on a communication function of a destination station associated with information on a telephone number of the destination station, wherein the protocol signal is communicated by said high speed modem in accordance with the information in said memory means.

4. A data communication apparatus according to claim 3 further comprising means for setting into said memory means information indicating that the communication of the communication protocol signal by the high speed modem to the destination station is permitted when the data communication for communicating the communication protocol signal by the low speed modem succeeds a predetermined number of times.

5. A data communication apparatus according to claim 1 wherein the communication of the communication protocol signal is conducted by the low speed modem when the communication of the protocol signal by the high speed modem fails.

6. A data communication apparatus having an ECM (error correction communication mode) communication function defined by the CCITT Recommendation, wherein a DCS (digital command signal) or NSS (non-standard facility set-up) control signal in said ECM communication function is transmitted and received immediately before an image signal by a modem having the same speed as a modem for the image signal.

7. A data communication apparatus having an ECM (error correction communication mode) communication function defined by the CCITT Recommendation wherein a DCS (digital command signal) or NSS (non-standard facility set-up) control signal in said ECM communication function is transmitted immediately before an image signal by a modem having the same speed as a modem for the image signal.

8. A data communication apparatus having an ECM (error correction communication mode) communication function defined by the CCITT Recommendation wherein a DCS (digital command signal) or NSS (non-standard facility set-up) control signal in said ECM communication function is received immediately before an image signal by a modem having the same speed as a modem for the image signal.

9. A data communication apparatus having an ECM (error correction communication mode) communication function defined by the CCITT Recommendation, wherein a PPS-Q (partial page signal) control signal in said ECM communication function is transmitted and received immediately before an image signal by a modem having the same speed as a modem for the image signal.

10. A data communication apparatus having an ECM (error correction communication mode) communication function defined by the CCITT Recommendation, wherein a PPS-Q (partial page signal) control signal in said ECM communication function is transmitted immediately before an image signal by a modem having the same speed as a modem for the image signal.

11. A data communication apparatus having an ECM (error correction communication mode) communication function defined by the CCITT Recommendation, wherein a PPS-Q (partial page signal) control signal in said ECM communication function is received immediately before an image signal by a modem having the same speed as a modem for the image signal.

12. A data communication apparatus having an ECM (error correction communication mode) communication function defined by the CCITT Recommendation and a function of transmitting a PPS-Q (partial page signal) control signal in said ECM communication function immediately after an image signal by a modem having the same speed as a modem for the image signal and a further function for stopping a transmission status of the modem immediately after the transmission of the PPS-Q (partial page signal) control signal.

13. A data communication apparatus having an ECM (error correction communication mode) communication function defined by the CCITT Recommendation and a function of transmitting a PPS-Q (partial page signal) control signal in said ECM communication function immediately after an image signal by a modem having the same speed as a modem for the image signal and a further function for stopping a reception status of the modem immediately after the reception of the PPS-Q control signal.

14. A data communication apparatus comprising:
means for storing information on a communication history of terminated communication to a destination station; and
means for selecting one of a plurality of communication methods including at least a first communication method and a second communication method in accordance with the stored information on a communication history of the terminated communication to the destination station,
wherein the first and second communication methods are different from each other in organization of communicating procedure signals.

15. A data communication apparatus having an ECM (Error Correction Communication Mode) communication function as defined by the CCITT Recommendation and means for storing a communication result including information on a change of an image communication speed during terminated communication with a destination station for each destination, further comprising:
means for omitting TCF (training check) and CFR (confirmation to receive) protocol signals in said ECM communication function in accordance with the stored result of communication with the destination station.

16. A data communication apparatus having an ECM (Error Correction Communication Mode) communication function as defined by the CCITT Recommendation and means for storing a communication result including information on a change of an image communication speed during terminated communication with a destination station for each destination and means for omitting TCF (training check) and CFR (confirmation to receive) protocol signals and for transmitting a DCS (digital command signal) signal in said ECM communication function by a same modem as that for an image signal in accordance with the stored result of communication with the destination station, further comprising:
means for detecting an RTN (retrain negative) signal after the transmission of the image signal; and
means for starting a normal protocol and retransmitting the DCS signal and the image signal in response to the reception of the RTN signal.

17. A data communication apparatus having an ECM (Error Correction Communication Mode) communication function as defined by the CCITT Recommendation and means for communicating while omitting TCF (training check) and CFR (confirmation to receive) protocol and means for receiving a DCS (digital command signal) signal in said ECM communication function by the same modem as that for an image signal, comprising:
means for detecting an end of the image signal when the DCS signal is not received;
means for declaring the transmission of an RTN (retrain negative) signal and the shift to a normal protocol at the end of the image signal; and
means for receiving retransmission of the DCS signal and the image signal.

18. A data communication apparatus having an ECM (error correction communication mode) communication function defined by the CCITT Recommendation and means for transmitting a PPS-Q (partial page signal) control signal in said ECM communication function immediately after an image signal by a modem having the same speed as a modem for the image signal and receiving a response signal by a V21 modem after the transmission of the PPS-Q control signal, comprising:

means for retransmitting the PPS-Q control signal by the V21 modem when the response signal is not received.

19. A data communication apparatus having an ECM communication function defined by the CCITT Recommendation and means for receiving a PPS-Q (partial page signal) control signal in said ECM communication function immediately after an image signal by a modem having the same speed as a modem for the image signal and transmitting a response signal by a V21 modem after the reception of the PPS-Q control signal, and means for conducting low/high speed modem reception after the transmission of the response signal, wherein the response signal is not transmitted when the PPS-Q control signal is not received in order to inform that the PPS-Q control signal is not received.

20. A data communication apparatus having an ECM (error correction communication mode) communication function as defined by the CCITT Recommendation and means for transmitting a DCS (digital command signal) control signal in said ECM communication function immediately before an image signal by a modem having a same speed as a modem for the image signal so as to conduct transmission without causing an absence of signal between the DCS control signal and the image signal, comprising:

means for identifying a leading block of a physical page which is not for retransmission; and means for transmitting the DCS control signal only immediately before the leading block of the physical page which is not for retransmission.

21. A data communication apparatus having an ECM (error correction communication mode) communication function defined by the CCITT Recommendation and means for transmitting a DCS (digital command signal) or NSS (non-standard set-up) control signal in said ECM communication function immediately before an image signal by a modem having the same speed as a modem for the image signal, comprising:

means for transmitting PPS-EOM (partial page signal-end of message) as a control signal indicating multi-page without regard to a change of image transmission mode.

22. A data communication apparatus comprising:

communication means having a first communication mode for conducting communication in accordance with a recommended communication protocol and a second communication mode for conducting communication in accordance with a communication protocol not recommended; and control means for causing said communication means to conduct communication in the second mode after causing said communication means to communicate, in the first communication mode, a first protocol signal indicating communication in the second communication mode, the first protocol signal being according to the recommended communication protocol, wherein said second communication mode is for transmitting a protocol signal as data, and wherein said second communication mode is for transmitting a protocol signal incorporated with data.

23. An apparatus according to claim 22, wherein said first communication mode is for communication according to the communication protocol based on the recommendation CCITT T30.

24. An apparatus according to claim 22, wherein said first protocol signal is an NSS (non-standard set-up) signal according to the recommendation CCITT T30.

25. An apparatus according to claim 22, wherein said control means communicates the first protocol signal in said first communication mode in a pre-procedure conducted before data communication.

26. An apparatus according to claim 22, wherein said data is image data.

27. A data communication apparatus comprising:

communication means having a first communication mode for conducting communication in accordance with a recommended communication protocol and a second communication mode for conducting communication in accordance with a communication protocol not recommended; and control means for causing said communication means to conduct communication in the second mode after causing said communication means to communicate, in the first communication mode, a first protocol signal indicating communication in the second communication mode, the first protocol signal being according to the recommended communication protocol, wherein said control means causes said communication means to transmit the first protocol signal, and wherein said control means causes said communication means to transmit the first protocol signal after said communication means receives a second protocol signal indicating information on a facility of a partner station.

28. An apparatus according to claim 27, wherein said second protocol signal is a signal according to the recommended communication protocol.

29. An apparatus according to claim 28, wherein said second protocol signal is an initial identification signal according to the recommendation CCITT T30.

30. An apparatus according to claim 29, wherein said second protocol signal is at least one of NSF (non-standard facilities), TSI (transmitting subscriber identification) and DIS (digital identification signal) signals according to the recommendation CCITT T30.

31. An apparatus according to claim 27, wherein said control means prevents said communication means from transmitting of said first protocol signal when a partner station is identified to be incapable of conducting communication in said second communication mode by the second protocol signal.

32. A data communication apparatus comprising:

communication means having a first communication mode for conducting communication in accordance with a recommended communication protocol and a second communication mode for conducting communication in accordance with a communication protocol not recommended; and control means for causing said communication means to conduct communication in the second mode after causing said communication means to communicate, in the first communication mode, a first protocol signal indicating communication in the second communication mode, the first protocol signal being according to the recommended communication protocol, wherein said control means causes said communication means to receive the first protocol signal, and wherein said control means causes said communication means to receive the first protocol signal after said communication means transmits a second protocol signal indicating information on a facility of said apparatus.

33. An apparatus according to claim 32, wherein said second protocol signal is a signal according to the recommended communication protocol.

34. An apparatus according to claim 33, wherein said second protocol signal is an initial identification signal according to the recommendation CCITT T30.

35. An apparatus according to claim 34, wherein said second protocol signal is at least one of NSF (non-standard facilities), TSI (transmitting subscriber identification) and DIS (digital identification signal) signals according to the recommendation CCITT T30.

36. A data communication apparatus, comprising:
communication means having a first communication mode for conducting communication in accordance with a standard communication protocol and a second communication mode for conducting communication in accordance with a special communication protocol;
identifying means for identifying a facility of a partner station; and
control means for causing said identifying means to identify a facility of the partner station and for causing said communication means to transmit a first protocol signal indicating communication in the second mode in accordance with a result of the identification,
wherein said second communication mode is for conducting communication in accordance with the special communication protocol, the special communication protocol being capable of reducing an overall communication time period,
wherein said second communication mode is for communicating a protocol signal at a same modem rate as that for data, and
wherein said second communication mode is for transmitting a protocol signal incorporated in data as the special communication protocol.

37. An apparatus according to claim 36, wherein said first communication mode is for conducting communication in accordance with the recommendation CCITT T30 as the standard communication protocol.

38. An apparatus according to claim 36, wherein the data is image data.

39. An apparatus according to claim 36, wherein said identifying means identifies a facility of the partner station on the basis of a second protocol signal received from the partner station.

40. An apparatus according to claim 39, wherein said second protocol signal is a signal according to the standard communication protocol.

41. An apparatus according to claim 40, wherein said second protocol signal is an initial identification signal according to the recommendation CCITT T30.

42. An apparatus according to claim 41, wherein said second protocol signal is at least one of NSF (non-standard facilities), TSI (transmitting subscriber identification) and DIS (digital identification signal) signals according to the recommendation CCITT T30.

43. An apparatus according to claim 36, wherein said first protocol signal is NSS (non-standard set-up) signal according to the recommendation CCITT T30.

44. An apparatus according to claim 36, wherein said control means communicates the first protocol signal in said first communication mode in a pre-procedure conducted before data communication.

45. An apparatus according to claim 36, wherein said control means prevents said communication means from transmitting the first protocol signal when said identifying means identifies that the partner station is incapable of communication in the second communication mode.

46. An apparatus according to claim 45, wherein said identifying means identifies a facility of the partner station in accordance with a second protocol signal received from the partner station.

47. An apparatus according to claim 46, wherein said second protocol signal is a signal according to the recommended communication protocol.

48. An apparatus according to claim 47, wherein said second protocol signal is an initial identification signal according to the recommendation CCITT T30.

49. An apparatus according to claim 48, wherein said second protocol signal is at least one of NSF (non-standard facilities), TSI (transmitting subscriber identification) and DIS (digital identification signal) signals according to the recommendation CCITT T30.

50. A data communication method for communicating a communication protocol signal by a low speed modem and data by a high speed modem, comprising the steps of:
communicating the protocol signal by the high speed modem by using first communication means; and
starting data communication by the high speed modem without reception of a signal by a modem different from the high speed modem, by using second communication means, after communication of the protocol signal by the high speed modem using the first communication means.

51. A data communication method according to claim 50 wherein the protocol signal is communicated prior to the data communication.

52. A data communication method according to claim 50 further comprising the step of storing, in a memory, information on a communication function of a destination station associated with information on a telephone number of the destination station, wherein the protocol signal is communicated by the high speed modem in accordance with the information in the memory.

53. A data communication method according to claim 52 further comprising the step of setting into the memory information indicating that the communication of the communication protocol signal by the high speed modem to the destination station is permitted when the data communication for communicating the communication protocol signal by the low speed modem succeeds a predetermined number of times.

54. A data communication method according to claim 50 wherein the communication of the communication protocol signal is conducted by the low speed modem when the communication of the protocol signal by the high speed modem fails.

55. A data communication method having an ECM (error correction communication mode) communication function defined by the CCITT Recommendation, wherein a DCS (digital command signal) or NSS (non-standard facility set-up) control signal in the ECM communication function is transmitted and received immediately before an image signal by a modem having the same speed as a modem for the image signal.

56. A data communication method having an ECM (error correction communication mode) communication function defined by the CCITT Recommendation, wherein a PPS-Q (partial page signal) control signal in the ECM communication function is transmitted and received immediately before an image signal by a modem having the same speed as a modem for the image signal.

57. A data communication method comprising the steps of:

storing information on a communication history of terminated communication to a destination station; and selecting one of a plurality of communication methods including at least a first communication method and a second communication method in accordance with the stored information on a communication history of the terminated communication to the destination station, wherein the first and second communication methods are different from each other in organization of communicating procedure signals.

58. A data communication method, having an ECM (Error Correction Communication Mode) communication function as defined by the CCITT Recommendation, and storing a communication result including information on a change of an image communication speed during terminated communication with a destination station for each destination, further comprising the step of:

omitting TCF (training check) and CFR (confirmation to receive) protocol signals in the ECM communication function in accordance with the stored result of communication with the destination station.

59. A data communication method, having an ECM (Error Correction Communication Mode) communication function as defined by the CCITT Recommendation, and storing a communication result including information on a change of an image communication speed during terminated communication with a destination station for each destination and omitting TCF (training check) and CFR (confirmation to receive) protocol signals and transmitting a DCS (digital command signal) signal in the ECM communication function by a same modem as that for an image signal in accordance with the stored result of communication with the destination station, further comprising the steps of:

detecting an RTN (retrain negative) signal after the transmission of the image signal; and starting a normal protocol and retransmitting the DCS signal and the image signal in response to the reception of the RTN signal.

60. A data communication method, having an ECM (Error Correction Communication Mode) communication function as defined by the CCITT Recommendation and communicating while omitting TCF (training check) and CFR (confirmation to receive) protocol and receiving a DCS (digital command signal) signal in said ECM communication function by the same modem as that for an image signal, comprising the steps of:

detecting an end of the image signal when the DCS signal is not received;

declaring the transmission of an RTN (retrain negative) signal and the shift to a normal protocol at the end of the image signal; and receiving retransmission of the DCS signal and the image signal.

61. A data communication method, having an ECM (error correction communication mode) communication function as defined by the CCITT Recommendation, transmitting a DCS (digital command signal) control signal in said ECM communication function immediately before an image signal by a modem having a same speed as a modem for the image signal so as to conduct transmission without causing an absence of signal between the DCS control signal and the image signal, comprising the steps of:

identifying a leading block of a physical page which is not for retransmission; and transmitting the DCS control signal only immediately before the leading block of the physical page which is not for retransmission.

62. A data communication method, having an ECM (error correction communication mode) communication function defined by the CCITT Recommendation, and transmitting a DCS (digital command signal) or NSS (non-standard set-up) control signal in the ECM communication function immediately before an image signal by a modem having the same speed as a modem for the image signal, comprising the step of:

transmitting PPS-EOM (partial page signal-end of message) as a control signal indicating multi-page without regard to a change of image transmission mode.

63. A data communication method comprising the steps of:

a communication step having a first communication mode for conducting communication in accordance with a recommended communication protocol and a second communication mode for conducting communication in accordance with a communication protocol not recommended; and a control step for causing the communication step to conduct communication in the second mode after causing the communication step to communicate, in the first communication mode, a first protocol signal indicating communication in the second communication mode, the first protocol signal being according to the recommended communication protocol, wherein the second communication mode is for transmitting a protocol signal as data, and wherein the second communication mode is for transmitting a protocol signal incorporated with data.

64. A method according to claim 63, wherein the first communication mode is for communication according to the communication protocol based on the recommendation CCITT T30.

65. A method according to claim 63, wherein the first protocol signal is NSS (non-standard set-up) signal according to the recommendation CCITT T30.

66. A method according to claim 63, wherein the control step communicates the first protocol signal in the first communication mode in a pre-procedure conducted before data communication.

67. A method according to claim 63, wherein the data is image data.

68. A data communication method comprising the steps of:

a communication step having a first communication mode for conducting communication in accordance with a recommended communication protocol and a second communication mode for conducting communication in accordance with a communication protocol not recommended; and a control step for causing the communication step to conduct communication in the second mode after causing the communication step to communicate, in the first communication mode, a first protocol signal indicating communication in the second communication mode, the first protocol signal being according to the recommended communication protocol, wherein the control step causes the communication step to transmit the first protocol signal, and wherein the control step causes the communication step to transmit the first protocol signal after the communication step receives a second protocol signal indicating information on a facility of a partner station.

69. A method according to claim 68, wherein the second protocol signal is a signal according to the recommended communication protocol.

70. A method according to claim 69, wherein the second protocol signal is an initial identification signal according to the recommendation CCITT T30.

71. A method according to claim 70, wherein the second protocol signal is at least one of NSF (non-standard facilities), TSI (transmitting subscriber identification) and DIS (digital identification signals) signals according to the recommendation CCITT T30.

72. A method according to claim 68, wherein the control step prevents the communication step from transmitting of the first protocol signal when a partner station is identified to be incapable of conducting communication in the second communication mode by the second protocol signal.

73. A data communication method comprising the steps of:
 a communication step having a first communication mode for conducting communication in accordance with a recommended communication protocol and a second communication mode for conducting communication in accordance with a communication protocol not recommended; and
 a control step for causing the communication step to conduct communication in the second mode after causing the communication step to communicate, in the first communication mode, a first protocol signal indicating communication in the second communication mode, the first protocol signal being according to the recommended communication protocol,
 wherein the control step causes the communication step to receive the first protocol signal, and
 wherein the control step causes the communication step to receive the first protocol signal after the communication step transmits a second protocol signal indicating information on a facility of the method.

74. A method according to claim 73, wherein the second protocol signal is a signal according to the recommended communication protocol.

75. A method according to claim 74, wherein the second protocol signal is an initial identification signal according to the recommendation CCITT T30.

76. A method according to claim 75, wherein the second protocol signal is at least one of NSF (non-standard facilities), TSI (transmitting subscriber identification) and DIS (digital identification signal) signals according to the recommendation CCITT T30.

77. A data communication method comprising the steps of:
 a communication step having a first communication mode for conducting communication in accordance with a standard communication protocol and a second communication mode for conducting communication in accordance with a special communication protocol;
 an identifying step for identifying a facility of a partner station; and
 a control step for causing the identifying step to identify a facility of the partner station and for causing the communication step to transmit a first protocol signal indicating communication in the second mode in accordance with a result of the identification,
 wherein the second communication mode is for conducting communication in accordance with the special communication protocol, the special communication protocol being capable of reducing an overall communication time period,
 wherein the second communication mode is for communicating a protocol signal at a same modem rate as that for data, and
 wherein the second communication mode is for transmitting a protocol signal incorporated in data as the special communication protocol.

78. A method according to claim 77, wherein the first communication mode is for conducting communication in accordance with the recommendation CCITT T30 as the standard communication protocol.

79. A method according to claim 77, wherein the data is image data.

80. A method according to claim 77, wherein the identifying step identifies a facility of the partner station on the basis of a second protocol signal received from the partner station.

81. A method according to claim 80, wherein the second protocol signal is a signal according to the standard communication protocol.

82. A method according to claim 81, wherein the second protocol signal is an initial identification signal according to the recommendation CCITT T30.

83. A method according to claim 82, wherein the second protocol signal is at least one of NSF (non-standard facilities), TSI (transmitting subscriber identification) and DIS (digital identification signal) signals according to the recommendation CCITT T30.

84. A method according to claim 77, wherein the first protocol signal is NSS (non-standard set-up) signal according to the recommendation CCITT T30.

85. A method according to claim 77, wherein the control step communicates the first protocol signal in the first communication mode in a pre-procedure conducted before data communication.

86. A method according to claim 77, wherein the control step prevents the communication step from transmitting the first protocol signal when the identifying step identifies that the partner station is incapable of communication in the second communication mode.

87. A method according to claim 86, wherein the identifying step identifies a facility of the partner station in accordance with a second protocol signal received from the partner station.

88. A method according to claim 77, wherein said second protocol signal is a signal according to the recommended communication protocol.

89. A method according to claim 88, wherein said second protocol signal is an initial identification signal according to the recommendation CCITT T30.

90. A method according to claim 89, wherein said second protocol signal is at least one of NSF (non-standard facilities), TSI (transmitting subscriber identification) and DIS (digital identification signal) signals according to the recommendation CCITT T30.

91. A data communication apparatus for communicating data in an error correction communication mode, comprising:
 first communication means for communicating a protocol signal by a high speed modem in the error correction communication mode; and
 second communication means for starting data communication by the high speed modem in the error correction communication mode successively after communication of the protocol signal by the high speed modem using said first communication means.

92. A data communication apparatus according to claim 91, wherein the protocol signal is communicated prior to the data communication.

93. A data communication apparatus according to claim 91, further comprising memory means for storing information on a communication function of a destination station associated with information on a telephone number of the destination station, wherein the protocol signal is communicated by said high speed modem in accordance with the information in said memory means.

94. A data communication apparatus according to claim 93, further comprising a low speed modem, and means for setting into said memory means information indicating that the communication of the communication protocol signal by the high speed modem to the destination station is permitted when the data communication for communicating the communication protocol signal by the low speed modem succeeds a predetermined number of times.

95. A data communication apparatus according to claim 91, further comprising a low speed modem, wherein the communication of the communication protocol signal is conducted by the low speed modem when the communication of the protocol signal by the high speed modem fails.

96. A data communication method for communicating data in an error correction communication mode, comprising the steps of:

first communicating a protocol signal by a high speed modem in the error correction communication mode; and starting data communication by the high speed modem in the error correction communication mode successively after communication of the protocol signal by the high speed modem in said first communicating step.

97. A data communication method according to claim 96, wherein the protocol signal is communicated prior to the data communication.

98. A data communication method according to claim 96, further comprising the step of storing in a memory means information on a communication function of a destination station associated with information on a telephone number of the destination station, wherein the protocol signal is communicated using the high speed modem in accordance with the information in the memory means.

99. A data communication method according to claim 98, further comprising the step of setting into the memory means information indicating that the communication of the communication protocol signal by the high speed modem to the destination station is permitted when the data communication for communicating the communication protocol signal using a low speed modem succeeds a predetermined number of times.

100. A data communication method according to claim 96, wherein the communication of the communication protocol signal is conducted using a low speed modem when the communication of the protocol signal by the high speed modem fails.

* * * * *

UNITED STATES PATENT AND TRADEMARK OFFICE
CERTIFICATE OF CORRECTION

PATENT NO. : 5,661,568

DATED : August 26, 1997

INVENTOR(S): YASUHIDE UENO

It is certified that error appears in the above-identified patent and that said Letters Patent is hereby corrected as shown below:

COLUMN 1
Line 4, "07/857 313" should read --07/857,313--;
Line 30, "fit" should read --ftt--.

COLUMN 3
Line 2, "Mar. 20, 1991)," should read --Mar. 20, 1990),--.

COLUMN 9
Line 7, "fine" should read --five--.

COLUMN 14
Line 42, "of" should be deleted.

COLUMN 19
Line 9, "of" should be deleted.

Signed and Sealed this

Nineteenth Day of May, 1998

*Attest:*

BRUCE LEHMAN

*Attesting Officer*        *Commissioner of Patents and Trademarks*